United States Patent Office 2,764,569
Patented Sept. 25, 1956

2,764,569
MOLDING COMPOSITIONS AND METHOD OF MAKING SAME

Ralph Waldo Emerson, Jackson, Miss., assignor to Emerite Corporation, Jackson, Miss., a corporation of Delaware No Drawing. Application July 13, 1953,
Serial No. 367,733

9 Claims. (Cl. 260—17.3)

This invention relates to new compositions resulting from the reaction of lignocellulose with furfural and urea in the presence of an acid, to new processes for producing them and to new manufactures made from them. The invention yields compositions useful in the manufacture of pressed or molded structures, and includes improvements both in methods of producing such compositions and in the compositions so produced.

According to the invention, molded or pressed articles, such as wall boards, table tops and other articles of various sizes sizes and shapes, are prepared by reacting cellulosic materials, for example, wood in various comminuted forms such as flour, sawdust, chips or shavings, other vegetable fibers such as cornstalks and bagasse, mechanical pulp, shredded newspaper and the like, herein referred to as lignocellulose, with urea and furfural in the presence of an acid at moderately elevated temperatures while maintaining the reaction mixture in the desired final shape at the desired final density.

Generally, the method comprises bringing about the simultaneous reaction in the presence of an acid catalyst at moderate temperatures of a major portion of lignocellulose which has been intimately mixed with minor portions of urea and furfural and maintained in the desired final shape at the desired final density. The term "acidic compound" as herein used, includes acid salts as well as inorganic acids and acidic organic compounds such as oxalic acid and carbolic acid.

The exact chemical reactions that take place are not known. However, it can be definitely established by an examination of the finished product that some chemical reactions between the lignocellulose, perhaps between the lignin present therein, the furfural and the urea, do take place. The fibers of the lignocellulose generally retain much of their shape, but become transformed into a partially fusible form and bond together into one unit.

One procedure for bringing about the desired reaction is to wet the lignocellulose with the urea dissolved in a small amount of water to insure intimate admixture and then to dry the mixture. The dried mixture is then thoroughly mixed with a liquid mixture of acid and furfural and the still damp final mixture is then molded or pressed into the desired shape and heated. In making the mix, urea is preferably in the form of a water solution so that the dispersion into the lignocellulose is uniform and complete, but it may be added in the form of a finely divided solid. When using a water solution of urea, the drying of the mixture of lignocellulosic material and urea is advantageous as it reduces the volume of liquid of the final mixtures, and results in an improved molded product.

The following is a representative example in parts by weight of the above procedure.

Example 1

A mixture of 1.7 parts of urea and 1.4 parts of water were thoroughly mixed with 15.0 parts sawdust and dried. A mixture of 2.5 parts of furfural and .5 part of concentrated (70%) nitric acid was then thoroughly mixed with the urea and sawdust. The composite mix was then placed in a platen press mold and heated to 135° C. and compressed with sufficient pressure to maintain the mixture in the mold for 10 to 15 seconds. A dense, hard, smooth-surfaced well reacted and bonded sheet was obtained.

In this particular procedure any acid may be used to promote the reaction, such as hydrochloric, sulfuric, phosphoric or nitric acid, acid salts such as potassium or sodium acid sulfate, and primary orthophosphate or organic acids such as oxalic acid. Ability to rapidly and completely penetrate the lignocellulose is important and it is advantageous to use the stronger acid where molding is followed immediately after the addition of the acid. Nitric acid has been found to be particularly advantageous. In this procedure, when nitric or hydrochloric acid is used the mixture shown be molded forthwith.

Another highly advantageous and simplified process for producing the novel products of the present invention is a dry molding process which consists in thoroughly intermixing lignocellulose material, urea, and furfural together with an acid such as sulfuric acid, an acid salt such as sodium bisulfate or organic acid such as oxalic acid and carbolic acid, then drying the mixture and subsequently molding this mixture in the dry state. The particular components according to this procedure may be mixed in any manner desired so long as they do not react together before or during the mixing operation. However, it has been found to be advantageous to first dissolve the urea in water and spray this into the lignocellulose in a mixer and thoroughly intermix the water solution of urea with the lignocellulose. Then mix together the acid or acid salt with furfural and water and then spray this mixture into the mixture of urea and lignocellulose. Following the above procedure in mixing the components results in better penetration of the chemicals into the lignocellulose fibers resulting in a better and more uniform product.

The acid or acid salt however must also be added to the mixture of lignocellulose, urea and furfural before it is dried. If a mixture of lignocellulose, urea and furfural, for example, is first dried and then the acid added, the mixture cannot be reacted or molded into a suitable product according to the present invention. This is true even if large amounts of nitric or hydrochloric acid are subsequently added after the mixture has dried.

The resulting damp mass may be dried immediately and stored or it may be allowed to stand in the damp condition and dried subsequently when desired or needed. It has also been found that if the mixture is allowed to stand two or three hours in the damp condition before drying, better penetration into the fibers results and when subsequently molded, a more uniform reaction takes place. After the mixture has been dried, it may then be molded into a dense, hard, smooth-surfaced article in the dry condition without any further treatment. The resulting dried molding composition is very loose and resembles the original lignocellulose material in a dry condition such as dry sawdust. If heat is used to dry the composition, care must be taken to avoid an excess of heat to prevent any permanent reaction between the components which would set the composition and render it useless for further molding.

Any acid or acid salt may be used in this process, however, when a fairly large amount of nitric or hydrochloric acid is used a reaction takes place almost immediately and it is necessary to confine the mix in a mold forthwith, and such a mixture cannot be dried and subsequently molded in the dry state. When relatively small amounts of nitric or hydrochloric acid are used, about 0.6% by weight of the lignocellulose, urea, and furfural, such a mixture can be dried and subsequently molded and reacted in the dry state according to the present invention. Sulfuric acid can also be used in this dry molding process and it is also advantageous to use less sulfuric acid than would be used if it were intended to mold the mixture forthwith, however large amounts of sulfuric acid in the dry molding process is permissible. Other acids and acid salts can be used in this dry molding process within a very wide range of concentration in the mixture. Some examples of these other acids are: phosphoric acid, sodium acid sulfate, acidic iron salts such as ferrous sulfate, acidic copper salts such as cupric sulfate, primary calcium phosphate, primary sodium phosphate, aluminum chloride, oxalic acid, acetic acid, carbolic acid, resorcinol, and the like. These acids should of course be added in a sufficient amount to promote the reaction and yet not to such an excess that the lignocellulose fibers will be seriously injured. The exact amount of acid or acid salts to be used to accomplish these results cannot be definitely stated, for it depends upon certain variants hereinafter pointed out. The use of cupric sulfate, ferrous sulfate, oxalic acid, carbolic acid, and sodium acid sulfate have been found to be particularly advantageous in the dry molding process.

The temperature required and the length of time the dried molding composition remains confined in a mold varies with the particular acid or acid salt employed. Sodium acid sulfate and copper sulfate, for example, can be molded into articles of excellent quality at about 150° C. or below in a matter of a few minutes, while sulfuric acid requires a temperature of about 250° C. to produce an article of equal quality in the same amount of time. The pressure necessary to mold the dry composition is very low. In fact, it is only necessary to use sufficient pressure to maintain the composition in confinement.

The following are representative examples in parts by weight of the dry molding process:

*Example 2*

226 parts of bagasse on a dry basis were thoroughly intermixed with 12 parts of urea dissolved in 50 parts of water by spraying the water solution of urea into the bagasse in a mixer. 10 parts of sodium acid sulfate and 9 parts of furfural were then mixed with 50 parts of water. The water solution of sodium acid sulfate and furfural was then sprayed into the mixer and thoroughly intermixed with the urea-bagasse mixture. The damp mass was then allowed to stand for about two hours and then dried and stored in the dry state for about four months. The dried composition was then placed in a mold having ¼ inch fixed stops and heated to about 150° C. for about four minutes. The pressure of the top plate of the mold on the fixed stops was below 200 p. s. i. A dense, hard, smooth-surfaced, well-reacted bonded sheet was obtained. The sheet was then baked in an oven for one hour at 400° F. and this additional baking appeared to have no effect whatever on the stability and strength of the sheet.

*Example 3*

295.5 parts of bagasse on a dry basis were thoroughly intermixed with 2.25 parts of urea dissolved in 50 parts of water by spraying the water solution of urea into the bagasse in a mixer. 2.5 parts of furfural and 3 parts of cupric sulfate were then mixed with 50 parts of water. The water solution of cupric sulfate and furfural was then sprayed into the mixer and thoroughly intermixed with the urea-bagasse mixture. The damp mass was then allowed to stand for about two hours and then dried and stored in the dry state for about four months. The dried composition was then placed in a platen press mold and compacted to the desired density by applying a pressure thereto of about 200 p. s. i. The dried molding composition was then heated to a temperature of 150° C. for about three minutes and then removed from the mold. The molded product was a dense, very strong, well-reacted bonded sheet. The molded sheet also had very good water resistance.

When using this process, the mixture, after being dried, may be stored for considerable lengths of time. This process is also highly advantageous because molding in the dry state eliminates the troublesome problem of molding a wet or damp mixture, which if not carefully controlled, will cause blowholes or blisters to be formed during the molding operation. It is also an advantage of this process that considerably less of the chemicals urea and furfural may be used than was heretofore possible, and still produce a very hard, strong smooth-surfaced board and maintaining the advantageous low pressure—low temperature molding.

It has also been found to be advantageous to add additional acid to the dried composition produced according to the dry molding method described above before molding the compositon. One advantage in adding additional acid before molding the mixture is that the temperature necessary to promote the reaction and also the time necessary to complete the reaction can be reduced and still maintain all the advantages of the dry molding method such as storage capability, and reduction of the amount of urea and furfural necessary.

Any acid may be used for this second addition including both nitric and hydrochloric acid. The acid can be added along with water if desired to aid in dispersing the acid throughout the composition. The use of nitric or hydrochloric acid as the second addition of acid are advantageous because they cause a more vigorous reaction to take place at very low temperatures and also the time required to complete the reaction is considerably reduced. As hereinbefore pointed out, when fairly large amounts of nitric or hydrochloric acid, about 2.5% by weight, are added to a mixture of lignocellulose, urea and furfural, the mixture must be molded forthwith to avoid complete reaction of the components while in an unconfined state and rendering the mixture useless. However, when adding large amounts of nitric or hydrochloric acid as the additional acid to the dried mixture produced according to the dry molding method disclosed above, the mixture can set for a considerable length of time with nitric or hydrochloric acid present therein without any adverse effects and it is not necessary to mold the mixture shortly after the addition of nitric or hydrochloric acid. Thus, in this manner advantage can be taken of these highly active acids in reducing the molding temperature and time required to complete the reaction without the disadvantage of having to mold soon after the acid addition.

The following is a representative example in parts by weight of the above procedure:

*Example 4*

240 parts of bagasse were intermixed thoroughly with 9 parts of furfural, 12 parts of urea, 4 parts of sulfuric acid and 50 parts of water. The weight of the bagasse was calculated on a dry basis, but the bagasse may be used wet as it comes from the sugar mill. Any method of distributing the chemicals and mixing them thoroughly with the lignocellulose is satisfactory so long as they do not react together before or during the mixing into the lignocellulose. The mixture was then dried and placed in storage for approximately three months. 8 parts of nitric acid were then added to the above mixture and the mix then pressed to ¼" stops for about 2 minutes at 150° C. in a platen press. A dense, hard, smooth-surfaced, well-reacted and bonded sheet was obtained.

The addition of the nitric acid could, of course, be made immediately after the drying of the original mixture, or after a long period of time, as desired. The original mixture with the sulfuric acid could also be molded or pressed before the mixture was dried, or after it had been dried. However, as noted above, when such a composition containing sulfuric acid has been dried, temperatures of about 250° C. are required to mold the dried composition, but with the addition of the second acid the temperature required is considerably reduced. A mold temperature as low as 80° C. may be used if desired.

The following discussion applies equally to any of the processes above described.

Amines and other amides such as hexamethylenetetramine, aniline, acetamide, thiourea and the like, may be substituted singly or together in part for the urea to modify some of the characteristics of the finished products in any of the procedures herein described. However, there is a practical limit to such partial substitutions because urea is a necessary constituent for the production of the moldable products of the present invention. This may be due to various causes not fully understood such as failure of a particular substituent to react sufficiently with the lignocellulose or with the furfural employed in the mix. Further, most of the practical substituents decompose upon the application of heat and form ammonia instead of reacting with the furfural or the lignocellulose. Such ammonia produces an alkaline reaction throughout the mass and stops or prevents the simultaneous reaction of this invention involving the urea, the furfural and the lignocellulose which proceeds only under acid conditions. Unfavorable reaction of ammonia where inevitably present can be prevented to a certain extent by increasing the acid concentration sufficiently to overcome the effects of the ammonia on the particular reaction of this invention; however, this is not desirable. It is also evident that the amount of substitution of urea which would be practical will vary depending upon the amounts of the other necessary constituents used, the temperature employed, and the particular substituent used.

The furfural penetrates the lignocellulose very rapidly and at an elevated temperature reacts very rapidly with the urea and the lignocellulose to produce a molded product with or without the use of pressure in a matter of seconds. Other aldehydes do not give the hard, quick-setting resin with urea that furfural does, nor do they react with the lignocellulose in the same vigorous manner. Other aldehydes such as butyraldehyde, formaldehyde and the like can be substituted in part for the furfural to vary the characteristics of the final product. However, there is a practical limit to such substitution. If too much of the other aldehydes are used and too little furfural, the quality and strength of the final product will be accordingly diminished.

The proportions of the various reactants will depend largely upon the end product desired and, therefore, it is not possible to define the maximum and minimum limits of each very closely. The percent deviations of the necessary reactants according to the present invention may be varied over a wide range and the percent deviations possible will be dependent upon many variable factors such as the addition of amines, aldehydes and fillers, the particular acid employed and the time and temperature of the reaction.

High pressures are not required to mold the mass into a particular shape or to produce a strongly bonded, smooth-surfaced article, because the chemical reaction produces bonds that hold the mass in the desired shape. All that is required is to hold the mass in the desired shape, mechanically or otherwise, for a sufficient time to permit the reaction to be completed to the extent that the newly formed compound or compounds will maintain their shape. High pressures may of course be used, if desired, to reduce the volume of a given mass and give a denser product.

The time of reaction and the time that the mass need be confined in a mold varies with the temperature and the amount of the various reactants used. The time of reaction and confinement may vary from a very few seconds to several minutes, and the temperature may also vary over a wide range. Too high a temperature maintained for too long a time will char the reactants and produce a weak and brittle product. It has been found advantageous to operate above 90° C. and below 180° C. in order to obtain fast reaction and to facilitate flow. However, temperatures below 90° C. and about 180° C. may be used if desired, and, in fact have been found to be advantageous in some instances.

All of the components of the composition of the present invention, that is, the urea, furfural and lignocellulose, must be reacted simultaneously in the presence of an acid in order to obtain an article of commercial value. The urea and furfural cannot be first reacted together and then added to the lignocellulose, nor can the urea or furfural be first reacted in the presence of an acid with the lignocellulose and the remaining components added at a later time. In such instance no molded product at all can be produced according to this invention, or the product is weak, brittle and poorly bonded. The reactions between the urea, furfural and lignocellulose must occur at the same time in the presence of an acid. In the dry molding process where the acid is added with the other components and then dried, no noticeable reaction takes place at all until sufficient heat is applied to promote the reaction. The dried product is very loose and resembles the original lignocellulosic material in a dry condition. Exactly what takes place during this preliminary mixing operation, or before or after the composition composed of lignocellulose, urea, furfural and acid is dried, is not understood; however, the acid seems to tie up the components in some manner permitting the composition to be stored for long periods of time and be subsequently molded.

The amount of acid necessary to promote the reaction according to the present invention will of course vary depending upon the particular acid or acid salt employed and also upon the particular type of lignocellulosic material utilized. An excess of acid will destroy the lignocellulose fiber and weaken the resulting product. About 16% by weight of acid or acid salt based on the weight of dry lignocellulose used would be about an average maximum that could be used without showing some signs of disintegration of the lignocellulose fiber. Similarly, the minimum amount of acid necessary to promote the reaction cannot be definitely established. If no acid at all is used, and the composition molded according to the present invention at low temperatures and pressures, the resultant product swells or springs back after being molded. It is spongy, weak, warps badly, and has very poor water resistance. When acid is added and gradually increased, the molded product gradually loses its poor qualities. The average minimum acid that could be employed without the molded product swelling or springing back is on the order of 1 per cent by weight based on the weight of dry lignocellulosic material. With this amount of acid the product is much stronger, does not readily warp, and has a fairly good water resistance. The above average figures on the concentration of acid were based on experiments performed on a composition containing 600 grams of wood fiber on a wet basic (300 grams dry), 9 grams of furfural, 12 grams of urea and 100 grams of water in which the acid concentration was varied. Sodium acid sulfate was used as the acid. However, it has been found to be advantageous to use about 2 per cent by weight and above of an acid salt based on the weight of dry lignocellulosic material. At about 2 per cent acid a very satisfactory molded product is produced.

Different acids, acid salts and acid type compounds such as carbolic acid also produce molded products according to the present invention having varying characteristics. The use of cupric sulfate, ferrous sulfate and sodium acid sulfate have been found to be particularly effective. The copper and ferrous sulfates permit a still further reduction in the amount of urea and furfural to produce a good quality molded product while maintaining all the advantages of the present invention. Copper and ferrous sulfate also work exceptionally well with bagasse. The use of copper sulfate results in a product with improved water resistance. Carbolic acid produces a product with an improved surface finish and feel.

The present invention permits the utilization of lignocellulose, such as wood waste or bagasse, in a rapid, efficient manner and with very low percentages of furfural, urea, and acid as compared to that of the wood waste. The products produced in accordance with the disclosure are thermosetting and can be cut, sawed, sanded, drilled, nailed or otherwise shaped, worked or treated like wood. The hardness, density, and strength of the product can be varied as desired by varying the reactants, temperature, pressure, and the time the pressure and temperature is maintained.

Inert fillers not containing lignin or lignocellulose, such as sand, expanded mica, asbestos, or relatively pure cellulosic materials such as cotton linters, may be added if desired. Such material will give weight, body, feel, surface finish and other characteristics to the product according to their own properties, but they will not enter into the reaction of this invention. Not such fillers can be used to replace the lignocellulosic material component without departing entirely from this invention, no useful product being obtained when this is attempted.

It is obvious that many modifications or variations may be made within the scope and spirit of the present invention, and the invention is not to be considered limited to any specfic embodiment herein disclosed except as defined by the appended claims. This application is a continuation in part of my copending application, Serial Number 260,088, filed December 5, 1951, now abandoned.

I claim:

1. A composition of matter formed by the simultaneous reaction of a major part of a raw, unreacted lignocellulosic material of at least one member selected from the group consisting of vegetable fibers, comminuted wood, bagasse, cornstalks, mechanical pulp and newspaper together with about 0.7 to about 11% by weight of urea based on the weight of the dry lignocellulosic material, and about 0.8 to about 16% by weight of furfural based on the weight of the dry lignocellulosic material, in the presence of between about 1 to 16% by weight, based on the weight of the dry lignocellulosic material, of an acidic compound of at least one member selected from the group consisting of an acid and an inorganic salt which products an acid reaction in water.

2. The method of making molded articles which comprises simultaneously reacting a major part of a raw, unreacted lignocellulosic material of at least one member selected from the group consisting of vegetable fibers, comminuted wood, bagasse, cornstalks, mechanical pulp and newspaper together with about 0.76 to about 11% by weight of urea based on the weight of the dry lignocellulosic material and about 0.8 to about 16% by weight of furfural based on the weight of the dry lignocellulosic material in the presence of between about 1 to 16% by weight, based on the weight of the dry lignocellulosic material, of an acidic compound of at least one member selected from the group consisting of an acid and an inorganic salt which produces an acid reaction in water.

3. The method of producing molded articles which comprises mixing a major part of a raw, unreacted lignocellulosic material of at least one member selected from the group consisting of vegetable fibers, comminuted wood, bagasse, cornstalks, mechanical pulp and newspaper together with about 0.76 to about 11% by weight of urea based on the weight of the dry lignocellulosic material and about 0.8 to about 16% by weight of furfural based on the weight of the dry lignocellulosic material and between about 1 to 16% by weight, based on the weight of the dry lignocellulosic material, of an acidic compound of at least one member selected from the group consisting of an acid and an inorganic salt which produces an acid reaction in water, forming the mixture into the desired shape at the desired density and simultaneously reacting said mixture by applying heat to the shaped mixture.

4. The method of producing molded articles which comprises mixing a major part of a raw, unreacted lignocellulosic material of at least one member selected from the group consisting of vegetable fibers, comminuted wood, bagasse, cornstalks, mechanical pulp and newspaper together with about 0.76 to about 11% by weight of urea based on the weight of the dry lignocellulosic material, and about 0.8 to about 16% by weight of furfural based on the weight of the dry lignocellulosic material, and between about 1 to 16% by weight, based on the weight of the dry lignocellulosic material, of an acidic compound of at least one member selected from the group consisting of an acid and an inorganic salt which produces an acid reaction in water, drying the mixture, forming the dried mixture to the desired shape and density and simultaneously reacting the mixture by applying heat to the shaped mixture.

5. The method of producing molded articles which comprises mixing a major part of a raw, unreacted lignocellulosic material of at least one member selected from the group consisting of vegetable fibers, comminuted wood, bagasse, cornstalks, mechanical pulp and newspaper together with about 0.76 to about 11% by weight of urea based on the weight of the dry lignocellulosic material in a water solution, intermixing therewith about 0.8 to about 16% by weight of furfural based on the weight of the dry lignocellulosic material, and between about 1 to 16% by weight, based on the weight of the dry lignocellulosic material, of an acidic compound of at least one member selected from the group consisting of an acid and an inorganic salt which produces an acid reaction in water, drying the mixture, forming the dried mixture to the desired shape and density and simultaneously reacting the mixture by applying heat to the formed mixture.

6. The method of producing molded articles which comprises mixing a major part of a raw, unreacted lignocellulosic material of at least one member selected from the group consisting of vegetable fibers, comminuted wood, bagasse, cornstalks, mechanical pulp and newspaper together with about 0.76 to about 11% by weight of urea based on the weight of the dry lignocellulosic material in a water solution, drying the mixture, then further intermixing in the dry mixture about 0.8 to about 16% by weight of furfural based on the weight of the dry lignocellulosic material, and between about 1 to 16% by weight, based on the weight of the dry lignocellulosic material, of an acidic compound of at least one member selected from the group consisting of an acid and an inorganic salt which produces an acid reaction in water, forming the mixture to the desired shape and density and simultaneously reacting the mixture by applying heat to the formed mixture.

7. The method of making molded articles which comprises mixing a major part of a raw, unreacted lignocellulosic material of at least one member selected from the group consisting of vegetable fibers, comminuted wood, bagasse, cornstalks, mechanical pulp, and newspaper together with about 0.76 to about 11% by weight of urea based on the weight of the dry lignocellulosic material and about 0.8 to about 16% by weight of furfural based on the weight of the dry lignocellulosic material and an acidic compound of at least one member selected from the group consisting of an acid and an inorganic salt which produces an acid reaction in water, drying the mixture, adding additional acidic compound of at least one member selected from the group consisting of an acid and an inorganic salt which produces an acid reaction in water, said acidic compound totaling between about 1 to 16% by weight based on the weight of the dry lignocellulosic material, forming the mixture to the desired shape and density, and simultaneously reacting the mixture by applying heat to the formed mixture.

8. The method of making a dry stable moldable composition which comprises mixing a major part of a raw, unreacted lignocellulosic material of at least one member selected from the group consisting of vegetable fibers, comminuted wood, bagasse, cornstalks, mechanical pulp, newspaper, about 0.76 to about 11% by weight of urea based on the weight of the dry lignocellulosic material and about 0.8 to about 16% by weight of furfural based on the weight of the dry lignocellulosic material, water, between about 1 to 16% by weight, based on the weight of the dry lignocellulosic material, of an acidic compound of at least one member selected from the group consisting of an acid and an inorganic salt which produces an acid reaction in water, and drying the mixture, said dried mixture being capable of simultaneous reaction between the lignocellulosic material, the urea and the furfural, by application of heat to form a strong molded product at low pressure.

9. A dry stable moldable composition capable of and adapted for simultaneous reaction of the components by application of heat thereto comprising a major part of a raw, unreacted lignocellulosic material of at least one member selected from the group consisting of vegetable fibers, comminuted wood, bagasse, cornstalks, mechanical pulp and newspaper, about 0.76 to about 11% by weight of urea based on the weight of the dry lignocellulosic material and about 0.8 to about 16% by weight of furfural based on the weight of the dry lignocellulosic material and between about 1 to 16% by weight, based on the weight of the dry lignocellulosic material, of an acidic compound of at least one member selected from the group consisting of an acid and an inorganic salt which produces an acid reaction in water.

References Cited in the file of this patent

UNITED STATES PATENTS

| | | |
|---|---|---|
| 1,827,824 | Novotny | Oct. 20, 1931 |
| 1,932,255 | Sherrard | Oct. 24, 1933 |
| 2,156,159 | Olson | Apr. 25, 1939 |
| 2,197,724 | Hovey | Apr. 16, 1940 |
| 2,381,205 | Caughey | Aug. 7, 1945 |